United States Patent [19]

Takeda et al.

[11] Patent Number: 5,808,295

[45] Date of Patent: Sep. 15, 1998

[54] ILLUMINATION MEANS HAVING LIGHT EMITTING ELEMENTS OF DIFFERENT WAVELENGTH EMISSION CHARACTERISTICS

[75] Inventors: Shinichi Takeda, Atsugi; Hidemasa Mizutani, Sagamihara; Noriyuki Kaifu, Hachioji; Isao Kobayashi, Atsugi, all of Japan

[73] Assignee: Canon Kabushiki Kaisha, Tokyo, Japan

[21] Appl. No.: 781,140

[22] Filed: Jan. 9, 1997

Related U.S. Application Data

[63] Continuation of Ser. No. 358,096, Dec. 16, 1994, abandoned.

[30] Foreign Application Priority Data

Dec. 24, 1993 [JP] Japan .................................. 5-327614

[51] Int. Cl.⁶ .............................. H04N 1/04; H01L 27/146
[52] U.S. Cl. ................... 250/216; 250/234; 250/227.11; 358/484; 362/16; 362/800
[58] Field of Search ............................... 250/208.1, 239, 250/227.11, 227.2, 227.29, 227.32, 234, 216; 358/475, 474, 482, 483, 484; 355/67, 70; 362/16, 296, 341, 800

[56] References Cited

U.S. PATENT DOCUMENTS

| | | | |
|---|---|---|---|
| 4,128,332 | 12/1978 | Rowe | 355/67 |
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,797,711 | 1/1989 | Sasada et al. | 355/32 |
| 4,908,717 | 3/1990 | Natori | 358/474 |
| 5,214,536 | 5/1993 | Prakash | 359/633 |
| 5,215,370 | 6/1993 | Kaplan | 362/296 |
| 5,241,459 | 8/1993 | Kaplan et al. | 362/298 |
| 5,499,112 | 3/1996 | Kawai et al. | 358/475 |

FOREIGN PATENT DOCUMENTS

| | | |
|---|---|---|
| 0021093 | 1/1981 | European Pat. Off. . |
| 0410703 | 1/1991 | European Pat. Off. . |
| 0460659 | 12/1991 | European Pat. Off. . |
| 0485975 | 5/1992 | European Pat. Off. . |
| 0504998 | 9/1992 | European Pat. Off. . |
| 59-123670 | 7/1984 | Japan . |
| 59-134975 | 8/1984 | Japan . |
| 59-138461 | 8/1984 | Japan . |
| 63-317351 | 12/1988 | Japan . |
| 2102058 | 4/1990 | Japan . |
| 3193366 | 8/1991 | Japan . |
| 5208504 | 8/1993 | Japan . |
| 5224019 | 9/1993 | Japan . |
| WO90-02971 | 3/1990 | WIPO . |

*Primary Examiner*—Edward P. Westin
*Assistant Examiner*—John R. Lee
*Attorney, Agent, or Firm*—Fitzpatrick, Cella, Harper & Scinto

[57] ABSTRACT

Illumination device, image apparatus using the device and information processing system using the apparatus for illuminating a light beam emitted from at least two light emitting elements of different light emission wavelength ranges to an original through a light conductor prevent irregularity of illumination on the original without providing compensation means to attain improvement in color discrimination ability of a color document sheet read signal without increasing a cost. A light beam applied from an illumination device 30 arranged at an end of a light conductor 3 is scattered and reflected by a scatter and reflection area 5 of the light conductor to illuminate the original 100. The illumination device 30 at least two light emitting elements 81G and 81R of different light emission wavelength ranges and centers of the light emitting elements are arranged at positions spaced from a normal line passing through a center of the scatter and reflection area 5.

56 Claims, 11 Drawing Sheets

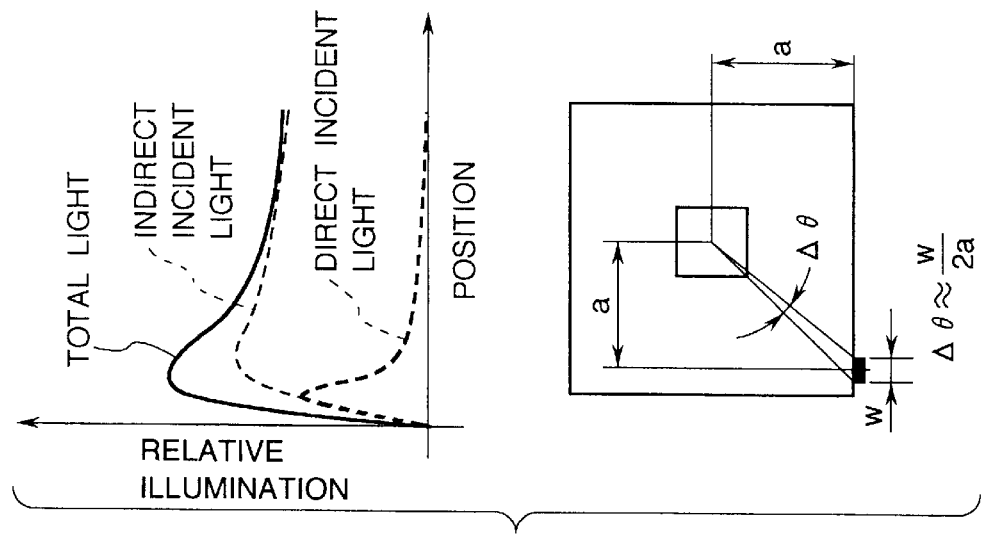
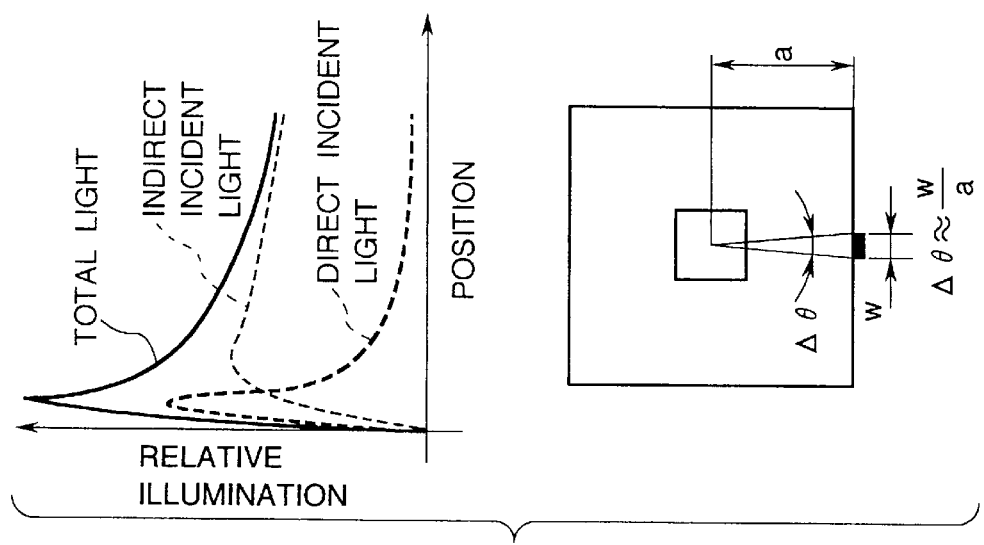
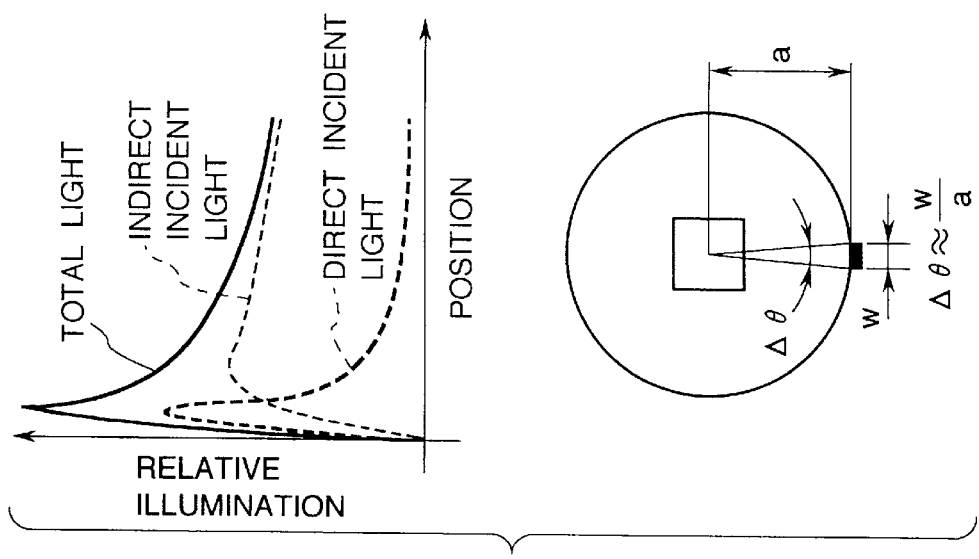

ILLUMINATION MEANS HAVING LIGHT EMITTING ELEMENTS OF DIFFERENT WAVELENGTH EMISSION CHARACTERISTICS

This application is a continuation of application Ser. No. 08/358,096 filed Dec. 16, 1994, now abandoned.

BACKGROUND OF THE INVENTION

1. Field of the Invention

The present invention relates to an illumination device, an image reading apparatus having the illumination device and an information processing system having the image reading apparatus, and more particularly to an information processing system such as copying apparatus, facsimile apparatus, scanner and electronic blackboard, an image reading apparatus used therein and an illumination device suitably used in the reading apparatus.

2. Related Background Art

In a prior art a reading apparatus of an information processing system such as a facsimile machine or an electronic copying machine, a discharge lamp such as a fluorescent lamp or an LED array having a number of LED chips in array has been used as an illumination device. Recently, as the facsimile machine is used even in home, a compact and low cost product is required and many products use the LED arrays.

In order to improve an output image quality, a function capable of outputting a multi-tone image which images a color document read information without drop while using mono-tone image has been replacing a conventional binary image system, and an improvement of color discrimination ability for color image read information in an image reading apparatus is required to cope with the future colorization.

A light source of an image reading apparatus to improve the color discrimination ability of the color document uses a plurality of LED's having a predetermined wavelength range and it is desired to emit a linear light beam from each of the LED light sources. An example of the image reading apparatus having the illumination device which uses such LED light sources is shown in FIGS. 1A to 1C.

FIG. 1A shows a sectional view of a photoelectric conversion element array of the image reading apparatus as viewed along a main scan direction, and FIG. 1B shows a side elevational view of the image reading apparatus as viewed along arrow A shown in FIG. 1A.

In FIGS. 1A to 1C, numeral 10 denotes a light transmissive sensor substrate on which a plurality of photo-electric conversion elements formed by using a thin film semiconductor layer such as amorphous silicon or polycrystalline silicon are arranged in one dimension. A protective layer, not shown, is provided on the light transmissive sensor substrate 10 to protect the photo-electric conversion elements, not shown, from damage due to relative movement to an original.

The light transmissive sensor substrate 10 is packaged on a light transmissive packaging substrate 15 by bonding and is electrically connected with a drive circuit, not shown, which is also packaged, by wire bonding.

Numeral 30 denotes an illumination means (light source) which comprises LED light sources 41R and 41G. Numeral 3 denotes a light transmissive member such as a silica rod having a circular cross-section, numeral 4 denotes an incident plane through which a light beam emitted from the illumination means 30 is applied to the light transmissive member 3, and numeral 5 denotes a scatter and reflection area for scattering and reflecting the light beam propagated through the light transmissive member 3 to take out of the light transmissive member 3. The scatter and reflection area 5 is formed by roughening a portion of the surface of the light transmissive member 3 or applying light diffusion reflective paint. Numeral 6 denotes a reflection plane formed at an end plane opposite to the illumination means 30 of the light transmissive member 3. The reflection plane may be formed by vapor depositing a metal such as aluminum to the surface of the end of the light transmissive member 3, or applying a light diffusion reflective paint, or it may be a separate member. A sectional shape of the light transmissive member 3 is commonly square or rectangular.

A read position of an original 100, an arrangement position of an illumination window of the light transmissive sensor substrate 10 and an optical axis along the array of the scatter and reflection area 5 of the light transmissive member 3 are set such that they are in a vertical plane passing through a read position of the document sheet 100.

A light beam L emitted from the LED light sources 41G and 41R of the respective light emission wavelengths of the illumination means 30 and directed into the light transmissive member 3 from the incident plane 4 of the light transmissive member 3 repeats the reflection at an inner surface of the light transmissive member 3 and propagates therein, and reaches the opposite plane to the incident plane 4, where it is again reflected and propagates in the light transmissive member 3. While it repeats the reflection, it reaches the scatter and reflection area 5 where it is diffused and a portion $I_1$ thereof is emitted from an exit plane located to oppose area 5 and it passes through the light transmissive packaging substrate 15 and the illumination window in the light transmissive sensor substrate 10 and irradiates the document sheet 100. Another portion $I_2$ of the diffused light beam is directed to the exit plane obliquely so that it is totally reflected and propagates in the light transmissive member. It repeats the propagation and finally reaches the incident plane 4 where it is emitted out.

The light beam which irradiates the document sheet 100 is reflected by the document sheet 100 and directed to the photo-electric conversion elements on the light transmissive sensor substrate 10 where it is photoelectrically converted to produce an image read signal which is output to an external device.

FIG. 1C shows distributions G and R of document plane illumination in a main scan direction of the photo-electric conversion element array of the light sources 41G and 41R having the respective light emitting wavelength ranges when the image reading apparatus shown in FIGS. 1A and 1B is used.

In the above example, as described above, the LED light sources 41G and 41R having a plurality of light emission wavelength ranges are used as the illumination means 30.

There are various sorts of LED light sources and they cannot be generally discussed, but an LED chip of a surface packaging type which attains further compaction and is convenient for packaging has been developed recently. FIG. 2 shows a surface packaging type LED light source. In FIG. 2, numeral 81 denotes an LED chip, numeral 82 denotes a substrate, numeral 83 denotes a reflection frame, numeral 84 denotes a light transmissive resin, and numerals 85 and 86 denote electrodes formed on a surface of the substrate 82. The size of the LED light source is less than 2 to 3 mm in length and less than 2 mm in height. Since the electrodes 85 and 86 are taken out via a side of the substrate 82, it can be packaged by merely placing creamy solder on the printed packaging substrate and heating (reflowing) it by a reflow oven. Thus, efficient packaging is attained. Accordingly, it is desirable to use such LED light source as a linear light source.

Since such LED light source has a light emission directivity as shown in FIG. 2, when a document sheet is to be illuminated by conducting, reflecting and diffusing the light by the light transmissive member 3 as shown in FIGS. 1A and 1B, the illumination distribution is not uniform, that is, the illumination is high in the area closer to the light source 30 and low in other areas. Thus, it poses a problem in the uniformity of the illumination distribution.

This is due to the fact that the light beam obliquely emitted from the LED light source 30 is directly applied to the area 5 of the light transmissive member 3, scattered there and taken out of the light transmissive member 3.

Another problem rises in that the illumination to the document sheet of different light emission wavelength ranges has different factors depending on the longitudinal position of the document sheet. This is due to the difference in the ratios of incident light beams, that is, the distributions, along the longitudinal side of the scatter and reflection area depending on the light emission wavelength range. (In FIG. 1C, solid line and broken line represent relative illumination distributions of green ray and red ray, respectively.)

Where special means to compensate such irregularity of illumination is to be provided, the mechanism is complicated and the cost increases.

FIG. 3 shows a perspective view of another example of the linear light source. The light sources 30 are arranged at the opposite ends of an elongated transparent member which is a light conductor 3.

Namely, in FIG. 3, numeral 3 denotes an elongated transparent member (light conductor), and numeral 11 denotes a direction of light emission. A cross section of the elongated transparent member 3 is constant, and it is mirror finished on a plane other than a light emitting plane. A light is emitted from an LED chip 71 on a substrate 45 and it is directed through an end of the elongated transparent member 3. The light is reflected directly or by the mirror finished reflection plane so that it is emitted out of the elongated transparent member 3. In FIG. 3, a plurality of LED chips having different light emission wavelengths are shown by an LED chip 71.

FIG. 4 shows a front view as viewed in the direction D of FIG. 3 and a light intensity distribution on an illumination plane (not shown). As shown, a uniform light intensity is attained between a and c but a total light intensity is low and a difference from the light intensity near the light source is large. Numerals 10a, 10b and 10c show sections at points a, b and c of the elongated transparent member 3, numerals 44a, 44b and 44c denote light intensity distributions, and a hatched area (the plane excluding the light emission plane and the light incident plane of the elongated transparent member 3) denotes a mirror finished plane.

In FIG. 4, the light intensity distribution is shown for one of the plurality of LED chips as a representative.

SUMMARY OF THE INVENTION

It is an object of the present invention to provide an illumination device which has a highly uniform illumination, is of low power consumption and easy to reduce the size, an image reading apparatus having the illumination device, and an information processing system having the image reading apparatus.

It is another object of the present invention to solve a problem of irregularity of illumination which is caused when the LED light source is used as a light source of a linear illumination device and a problem of a large difference in illumination between a point close to the LED light source and a point spaced therefrom.

It is another object of the present invention to provide an illumination device for directing light beam from a light emitting elements having at least two light emission wavelength ranges to an original through a light conductor, an image reading apparatus having the illumination device and an information processing system having the reading apparatus wherein the irregularity of the illumination of the document sheet is prevented without providing correction means and the color discrimination ability of a colored original read signal is improved without increasing the cost.

It is another object of the present invention to provide an illumination device for illuminating an original by scattering and reflecting a light beam emitted from illumination means arranged at an end of a light conductor at a scatter and reflection area of the light conductor, said illumination means having at least two light emitting elements of different light emission wavelength ranges, and said light emitting elements being spaced from a normal line passing through a center of the scatter and reflection area.

It is another object of the present invention to provide a reading apparatus comprising: a light transmissive member having a light incident plane at an end and a light beam exit plane in a longitudinal plane other than said end; a light source for emitting a light beam to be applied to said light incident plane; a photo-electric converter for receiving a reflected light from the illuminated area of the light emitted from said light emitting plane; an area for reflecting and/or scattering the light beam applied to said light transmissive member provided at a portion of said light transmissive member facing the light beam exit plane and along the longitudinal direction; and at least two light emitting elements of different light emission wavelength ranges having centers thereof spaced from a normal line to said area.

It is another object of the present invention to provide an information processing system comprising: (a) a photo-electric converter having a plurality of photo-electric conversion elements arranged to face a document sheet image to be read; (b) an illumination device for illuminating the original; (c) transport means for transporting the original; (d) an output unit for recording an image on a sheet by an electrical signal in accordance with image information; and (e) a controller for controlling said photo-electric conversion element, said illumination device, said transport means and said output unit; said illumination device including a light transmissive member having a light incident plane at an end thereof and a light exit plane in one longitudinal plane other than said end, a light source having at least two light emitting elements of different light emission wavelength ranges provided to emit the light beam to be applied to said light incident plane, an area for reflecting and/or scattering the light beam applied to said light transmissive member being provided in a portion of said light transmissive member facing the light beam exit plane, centers of said light emitting elements being arranged at positions spaced from a normal line to said area.

BRIEF DESCRIPTION OF THE DRAWINGS

FIGS. 5A to 5C and 6A to 6C illustrate illumination devices according to first embodiment of the present invention.

DETAILED DESCRIPTION OF THE PREFERRED EMBODIMENTS

The linear light source as the illumination device described above has a low total light intensity and is not uniform in the light intensity distribution as described above. This is because the light from the LED chip as the light source is not uniformly and sufficiently emitted from the internal of the elongated transparent member (light conductor) 3.

Thus, in the present invention, the arrangement of the light source is carefully considered to assure the uniformity of the longitudinal light emission characteristic regardless of the colors emitted by the light source.

Namely, in accordance with the present invention, an LED chip comprising at least two light emitting elements having different light emission wavelength ranges is arranged such that a center thereof is off a normal line passing through a center of a scatter and reflection area of a light transmissive member. Thus, a light beam which is directly applied to the scatter and reflection area in the respective light emission wavelength ranges decreases and an indirect light reflected in the light transmissive member increases accordingly. As a result, the high illumination at only the area close to the LED light source is avoided and the longitudinal illumination of the light transmissive member is uniform.

Further, in each light emission wavelength range, since the light beam directed to the scatter and reflection area is longitudinally uniform, the ratio of the illuminations of different light emission wavelength ranges at any longitudinal position of the original illumination can be equal.

Embodiments of the present invention are now explained in conjunction with the drawings.

Embodiment 1

Figure 1A:
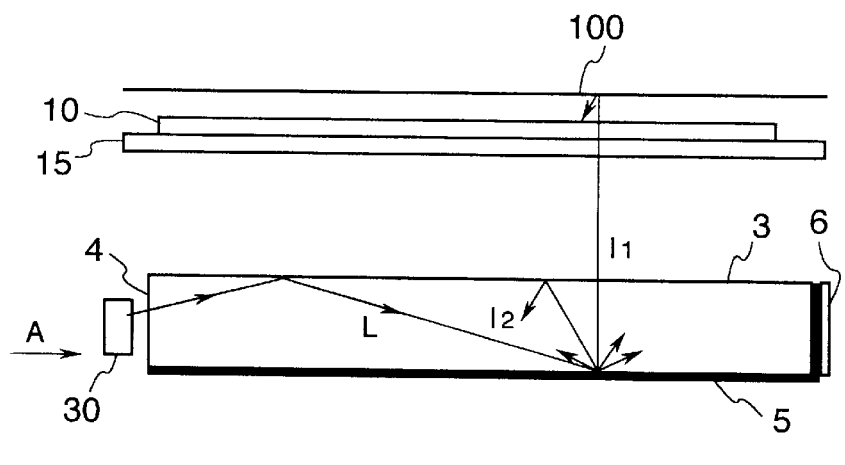
FIGS. 1A, 1B, 1C and 3 show illumination devices with LED light sources.
Figure 1B:
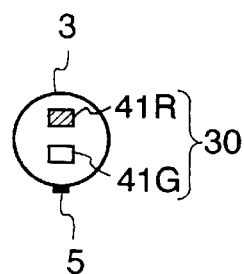
Figure 1C:
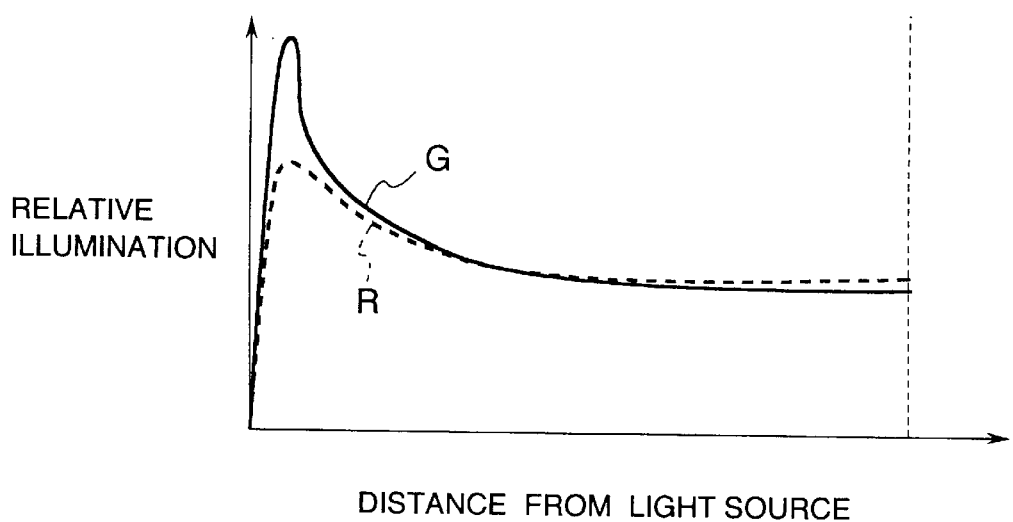
Figure 2:
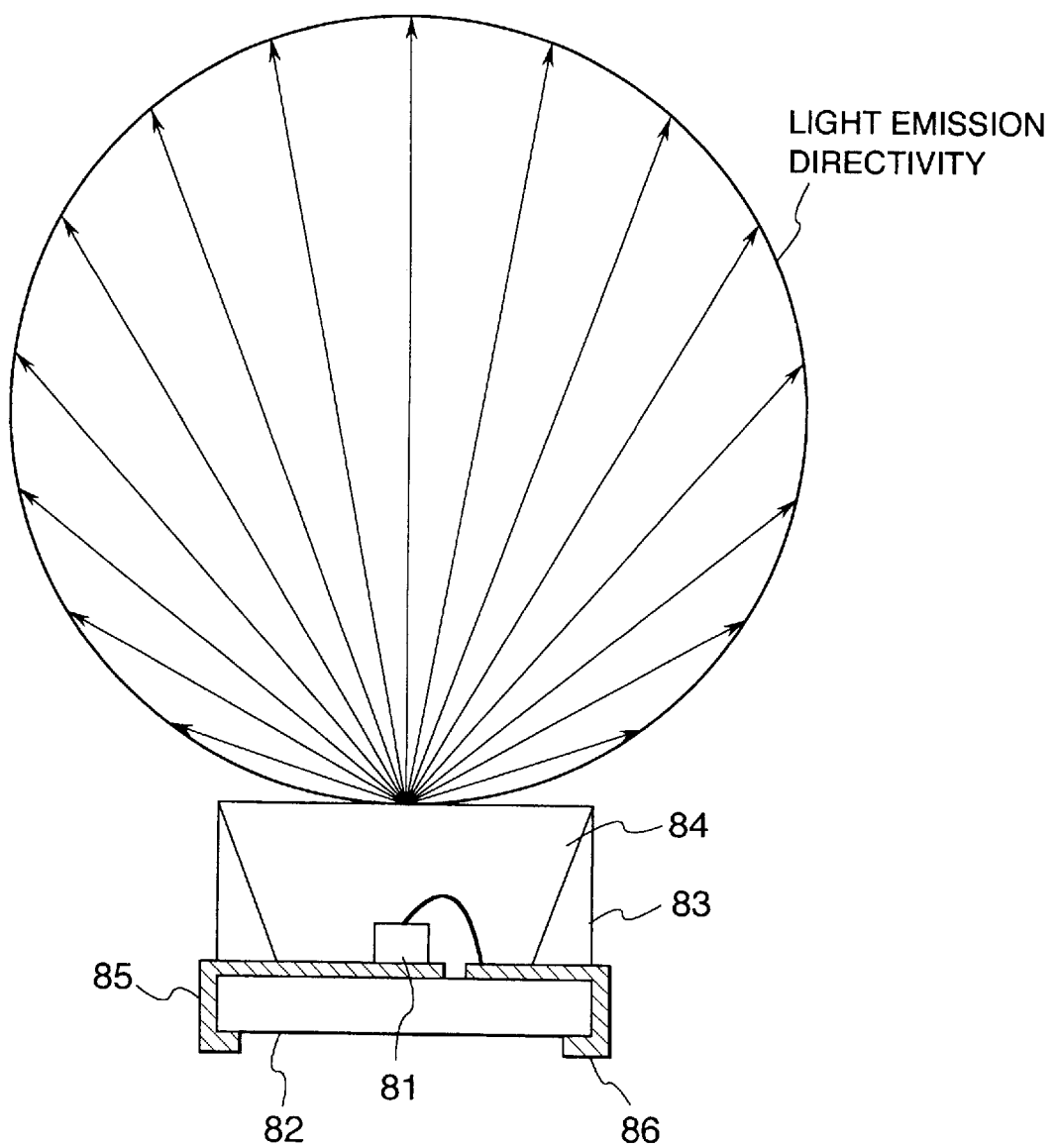
FIG. 2 shows an example of the LED light source.
Figure 3:
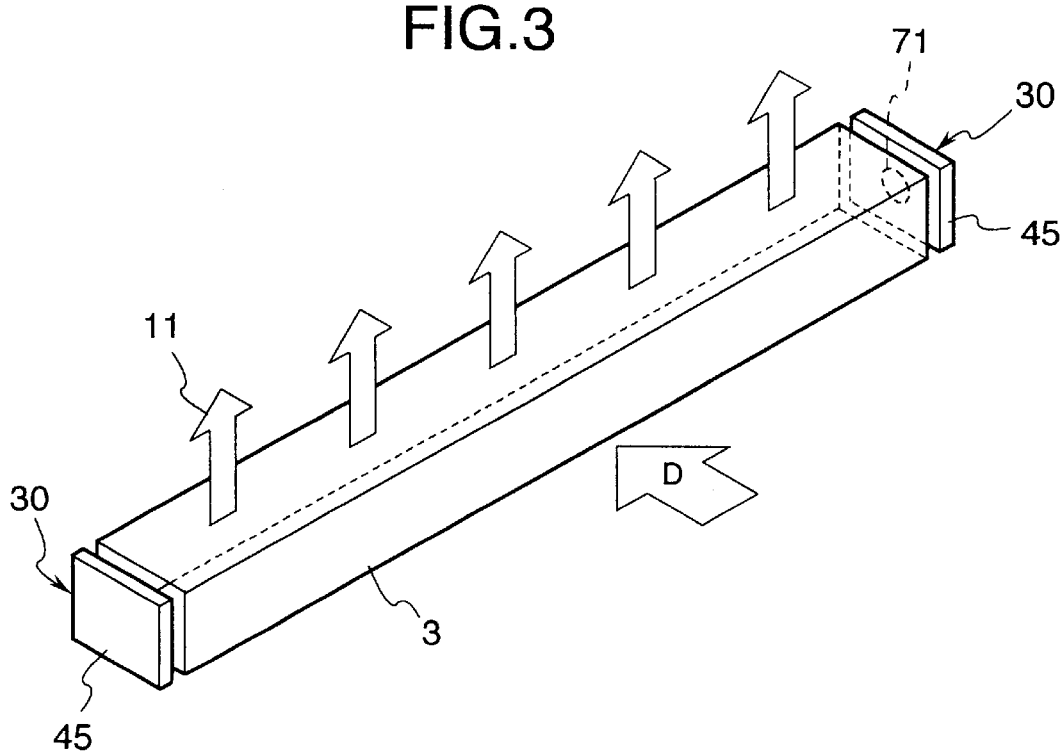
Figure 4:
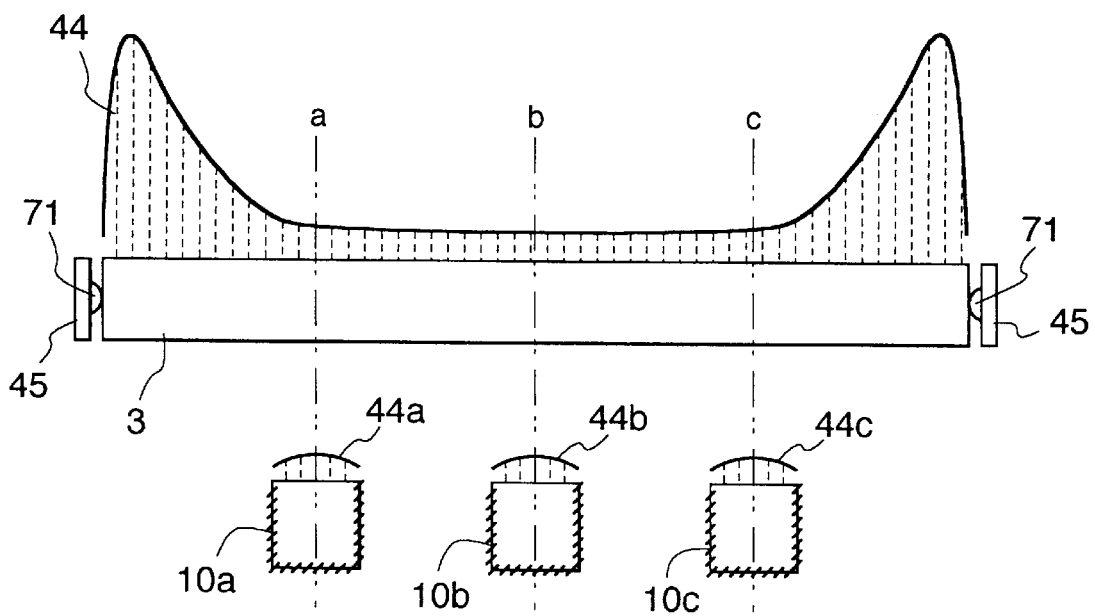
FIG. 4 shows an illumination distribution in the illumination device of FIG. 3.
Figure 5A:
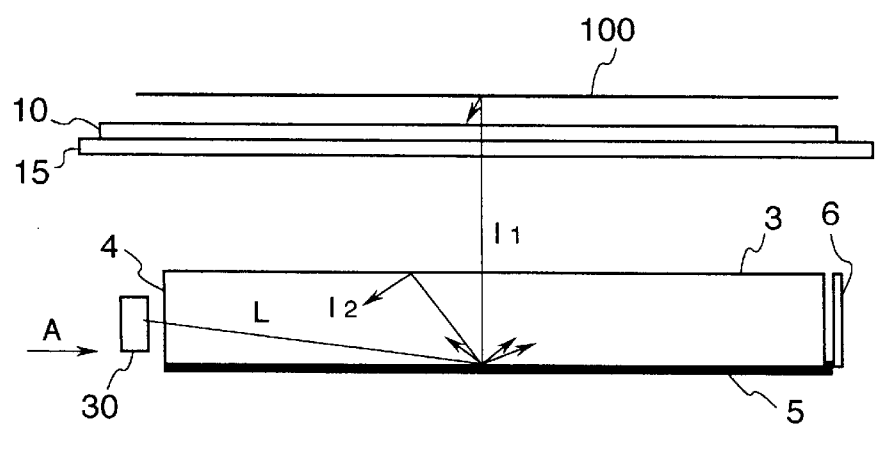
Figure 5B:
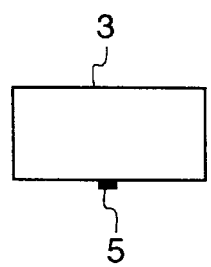
Figure 5C:
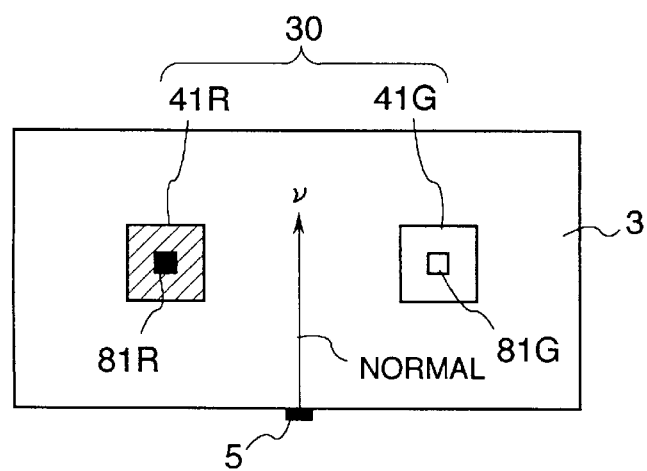

FIG. 5 shows a preferred embodiment of the image reading apparatus of the present invention. FIG. 5A shows a sectional view of a photo-electric conversion element array of the image reading apparatus as viewed along a main scan direction, and FIG. 5B shows a sectional view of the photo-electric conversion element array of the image reading apparatus as viewed along a sub-scan direction. FIG. 5C shows a side elevational view of the image reading apparatus as viewed along a direction A shown in FIG. 5A.

In FIGS. 5A to 5C, numeral 10 denotes a light transmissive sensor substrate on which a plurality of photo-electric conversion elements formed by using a thin film semiconductor layer such as amorphous silicon or polycrystalline silicon are arranged in one dimension. A protective layer, not shown, is formed on the light transmissive sensor substrate 10 to protect the photo-electric conversion elements, not shown, from damage by relative movement to a document sheet.

The light transmissive sensor substrate 10 is packaged on a light transmissive packaging substrate 15 by bonding and is electrically connected to a drive circuit, not shown, packaged thereon by wire bonding.

Numeral 3 denotes a light conductor made of a light transmissive member having a rectangular section. Numeral 30 denotes a light source which comprises LED chips 81G and 81R which are light emitting elements having different light emission wavelength ranges as shown in FIG. 5C.

In the present embodiment, the LED chip 81G has a green light emission wavelength range (center light emission wavelength 560 nm, half value 30 nm) and the LED chip 81R has a red light emission wavelength range (center light emission wavelength 650 nm, half value 30 nm).

In order to reflect the light beam, a scatter and reflection area 5 is formed on a plane facing an exit area of the light beam from the light transmission member 3 by roughening the surface of the light transmissive member 3 or applying light diffusion and reflective paint.

A reflection area 6 for reflecting a light beam propagated through the light transmissive member 3 is formed on the end plane of the light transmissive member 3 opposite to the light source 30. The reflection area 6 is formed by vapor depositing a metal such as aluminum to the surface of the end of the light transmissive member or applying light diffusing and reflective paint, or it may be formed as a separate member.

The read position of the document sheet 100, the arrangement position of an illumination window of the light transmissive sensor substrate 10 and an optical axis along the array direction of the scatter and reflection area 5 of the light transmissive member 3 are set such that they are in a normal plane passing through the read position of the original 100.

Of the light beams emitted from the LED chips 81G and 81R of the respective light emission wavelength ranges of the light source 30, a light beam L directed to the scatter and reflection area 5 is scattered and reflected by the scatter and reflection area 5 and a portion $I_1$ of the light beam goes out of the light transmissive member 3, passes through the light transmissive packaging substrate 15 and the illumination window the light transmissive sensor substrate 10 to illuminate the original 100, and the light beam which illuminated the document sheet 100 is reflected by the original 100 and directed to the photo-electric conversion elements on the light transmissive sensor substrate 10 as an information light and photo-electrically converted thereby, and output to the external as an image read signal. Another portion $I_2$ of the scattered and reflected light beam further propagates through the light transmissive member 3.

In the present embodiment, centers of the LED chips 81G and 81R of the respective light emission wavelength ranges of the light source 30 are deviated from a normal line passing through the center of the scatter and reflection area 5.

In order to simplify the explanation of an operation of the present embodiment, a right half of FIG. 5C, that is, only the light beam emitted by the LED chip 81G is considered.

FIGS. 6A to 6C illustrate a difference between the illumination device of the present embodiment and other illumination devices. FIGS. 6A and 6B show examples of other illumination devices, and FIG. 6C shows the right half of the embodiment of the present invention shown in FIG. 5C.

FIGS. 6A to 6C show a side elevational view of the light transmissive member 3 and the light source 30 as viewed in the direction A shown in FIG. 5A and an illumination distribution on the document sheet plane attained when the illustrated illumination device is used.

As shown, in FIG. 6A, the light transmissive member 3 having a circular cross section is used with the center thereof coinciding with the center of the LED chip 81 and the normal line passing through the center of the scatter and reflection area 5 passing through the center of the LED chip 81. In FIG. 6B, the light transmissive member 3 has a rectangular cross section, and a cross point of diagonal lines thereof coincides with the center of the LED chip 81 and the normal line passing through the center of the area 5 passes through the center of the LED chip 81.

FIG. 6C shows the right half of the embodiment of the present invention. The light transmissive member has a rectangular cross section and the center of the LED chip 81 is spaced from the normal line passing through the widthwise center of the scatter and reflection area 5 by a distance a.

In any case, the distance from the center of the LED chip 81 and the plane of the light transmissive member on which the scatter and reflection area 5 is formed is equal to a, the LED chips 81 are identical and they are identical to the LED chips 81G used in the present embodiment.

The light beam emitted from the LED chip 81 and directed to the light transmissive member 3 may be divided into a direct incident light which is directly applied to the scatter and reflection area 5 without being reflected by the internal plane of the light transmissive member 3, and an indirect incident light which is applied after at least one reflection by the internal plane.

The direct incident light is now considered. A light intensity which is directly applied to the scatter and reflection area 5 depends on an angle $\Delta\theta$ looking into the scatter and reflection area 5 from the center of the LED chip 81. The larger $\Delta\theta$ is, the larger is the light intensity of the direct incident light, and the smaller it is, the smaller is the light intensity. Assuming that a width of the scatter and reflection area 5 is w and a vertical distance from the center of the LED chip 81 to the scatter and reflection area 5 is a, the angle $\Delta\theta$ is given by $$\Delta\theta = 2\tan^{-1}\{(w/2)/a\} \cong w/a$$

because the LED light source is located immediately above the scatter and reflection area 5 in FIGS. 6A and 6B.

On the other hand, in the embodiment of the present invention shown in FIG. 6C, the LED chip 81 is located not immediately above the scatter and reflection area 5 but laterally spaced by the distance a. Accordingly, the angle $\Delta\theta$ is given by $$\Delta\theta = 2\tan^{-1}\{(w/2 \times 2^{1/2})/2^{1/2}xa\} \cong w/2a$$

which is approximately one half of that of FIGS. 6A and 6B.

Thus, in the present embodiment, the light intensity of the direct incident light is reduced compared to that of the prior art.

On the other hand, the indirect incident light increases accordingly. As a result, the illumination distribution of the document sheet is improved as a whole because the peak near the LED light source is suppressed.

This will be readily understood from a graph of a relative illumination versus the distance from the light source shown in FIGS. 6A to 6C. In FIGS. 6A and 6B, the peak and the light intensity of the indirect incident light at the area close to the light source are so large that the total light intensity of the indirect incident light and the direct incident light is not uniform but has a peak closely to the light source. On the other hand, in the present embodiment as shown in FIG. 6C, the peak of the direct incident light is reduced compared to those of FIGS. 6A and 6B, and the peak of the indirect incident light is deviated away from the light source so that the total light intensity is uniform over a wide longitudinal range although it is reduced in the area close to the light source. Namely, the usability as the illumination device is significantly improved.

The total illumination gradually decreases at the area farther from the light source than from the peak of the indirect incident light, but it is actually compensated by the light reflected by the reflection area 6 provided on the opposite side of the light source 30 shown in FIG. 5A so that the illumination is kept uniform.

In FIG. 6C, only the right half of the present embodiment is shown. As shown in the present embodiment of FIG. 5C, when the LED light sources 41G and 41R having different light emission wavelength ranges are provided laterally with respect to the normal line, the respective LED light sources operate in the same manner and the light beam emitted from the LED chip 81G and the light beam emitted from the LED chip 81R are uniformly directed longitudinally to the scatter and reflection area 5 so that the longitudinal illumination of the document sheet is uniform for the respective light emission wavelength range. Further, since the illumination of the document sheet of the different light emission wavelength ranges is uniform, the ratios of illuminations of the different light emission wavelength ranges at any longitudinal position of the document sheet illumination are equal or can be made closer.

The deviation between the LED chips 81G and 81R is at least that which assures the deviation from the normal line passing through the center of the scatter and reflection area 5 of the light transmissive member 3, but when the deviation is too large, most of the light beam from the LED chip 81G or 81R are indirect light and a loss of the light beam in the light transmissive member 3 increases. Accordingly, it should be appropriately selected. If it is extremely deviated, the illumination decreases at the position where the light source is located.

By arranging the light source in this manner, the high color discrimination ability and multi-tone output image are attained without providing an illumination compensation circuit and a high quality color read signal is produced and a low cost and compact information processing system is provided.

In the present embodiment, while the light source comprises a pair of LED light sources having the different light emission wavelength ranges, the present invention is not limited thereto. The light source may comprise at least two light sources having different light emission wavelength ranges with the center of the LED chip of the light source being deviated from the normal line passing through the center of the scatter and reflection area so that the light intensity directed to the scatter and reflection area is uniform. For example, in the present embodiment, a light source which uses an LED chip having a blue light emission wavelength range (center light emission wavelength 470 nm, half width 70 nm) may be added and a plurality of LED chips of the respective light emission wavelength ranges may be arranged. In this manner, a higher fidelity color documents sheet read signal to produce a color image can be produced at a low cost.

Embodiment 2

Figure 7A:
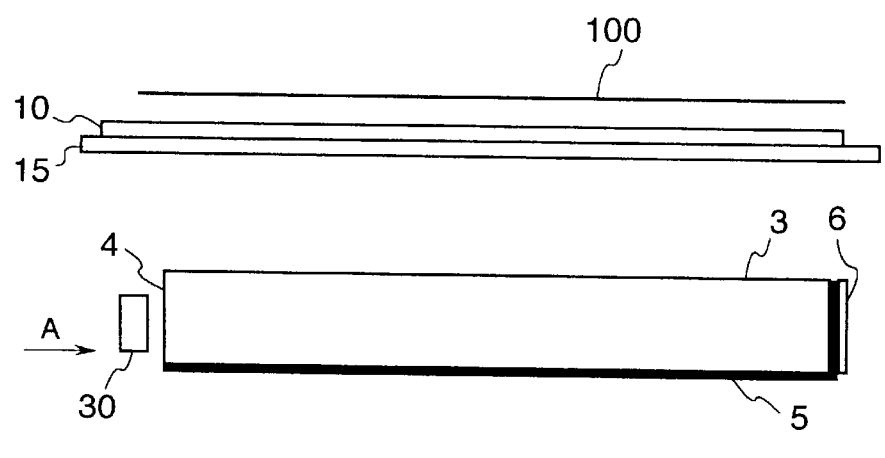
FIGS. 7A to 7C show illumination devices according to second embodiment.
Figure 7B:
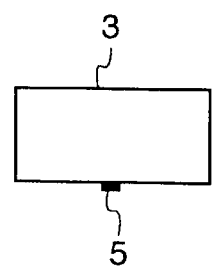
Figure 7C:
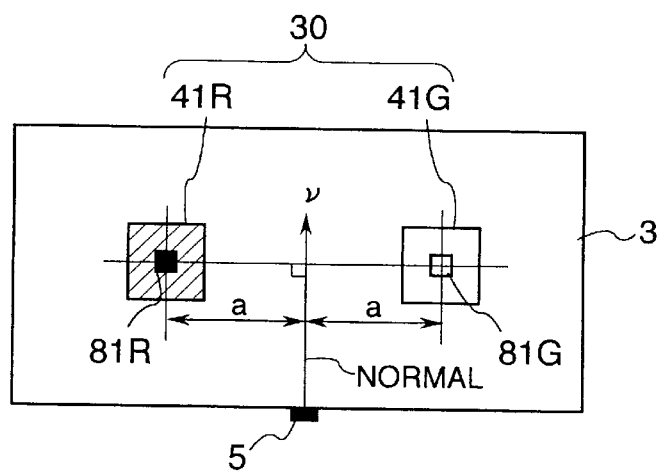

Referring to FIGS. 7A to 7C, a second embodiment of the present invention is now explained.

FIGS. 7A to 7C show the second embodiment of the present invention. FIG. 7A shows a sectional view of the photo-electric conversion element array of the image reading apparatus as viewed along the main scan direction, and FIG. 7B shows sectional view of the photo-electric conversion element array of the image reading apparatus as viewed along the sub-scan direction. FIG. 7C shows a side elevational view of the image recording apparatus as viewed in the direction A shown in FIG. 7A.

FIGS. 7A to 7C correspond to FIGS. 5A to 5C of the Embodiment 1 of the present invention, and the like elements in FIGS. 7A to 7C to those shown in FIGS. 5A to 5C are designated by the like numerals.

In FIGS. 7A to 7C, like in the Embodiment 1, numeral 10 denotes a light transmissive sensor substrate, numeral 15 denotes a light transmissive packaging substrate and numeral 3 denotes a light conductor having a rectangular cross section. Like in the Embodiment 1, a light source 30 is formed closer to a light beam incident plane 4 and a reflection area 6 is formed on the opposite side.

Like in the Embodiment 1, the read position of the document sheet 100, the arrangement position of the illumination window of the light transmissive sensor substrate 10 and the optical axis along the array direction of the scatter and reflection area 5 of the light transmissive member 3 are set such that they are in the normal plane passing through the read position of the document sheet 100.

As shown in FIG. 7C, in the present embodiment, the LED chips 81G and 81R of different light emission wavelength ranges of the light source 30 are arranged symmetrically and normally to the normal line passing through the center of the scatter and reflection area 5 with a spacing therefrom.

Like in the Embodiment 1, in the present embodiment, the LED chips 81G and 81R of the respective light emission wavelength ranges of the light source 30 are deviated from the normal line passing through the center of the scatter and reflection area 5 so that the document sheet illumination of the respective light emission wavelength ranges is uniform. In the present embodiment, the centers of the LED chips 81G and 81R of the respective light emission wavelength ranges of the light source 30 are arranged symmetrically and normally to the normal line passing through the center of the scatter and reflection area 5 with the space therefrom. Accordingly, the light beams directly applied to the scatter and reflection area 5 from the LED chips 81G and 81R can be applied at the same efficiency longitudinally and the document sheet illumination distributions of different light emission wavelength ranges are attained at the same distribution. Thus, the high quality color document sheet read signals in the respective light emission wavelength ranges are produced and a low cost and compact information processing system is provided.

In any embodiment, the light sources 30 may be arranged at the opposite ends of the light transmissive member 3 and the types of the light emitting light sources at the opposite ends may not be identical. For example, when the light emission intensity of one of the red (R), green (G) and blue (B) is low, the low one may be arranged at the opposite side and the other may be arranged on the end planes to adjust the light intensity.

When required, the light intensity may be adjusted through a filter.

An embodiment of an information processing system to which the illumination device of the present invention is applied is now explained.

Figure 8:
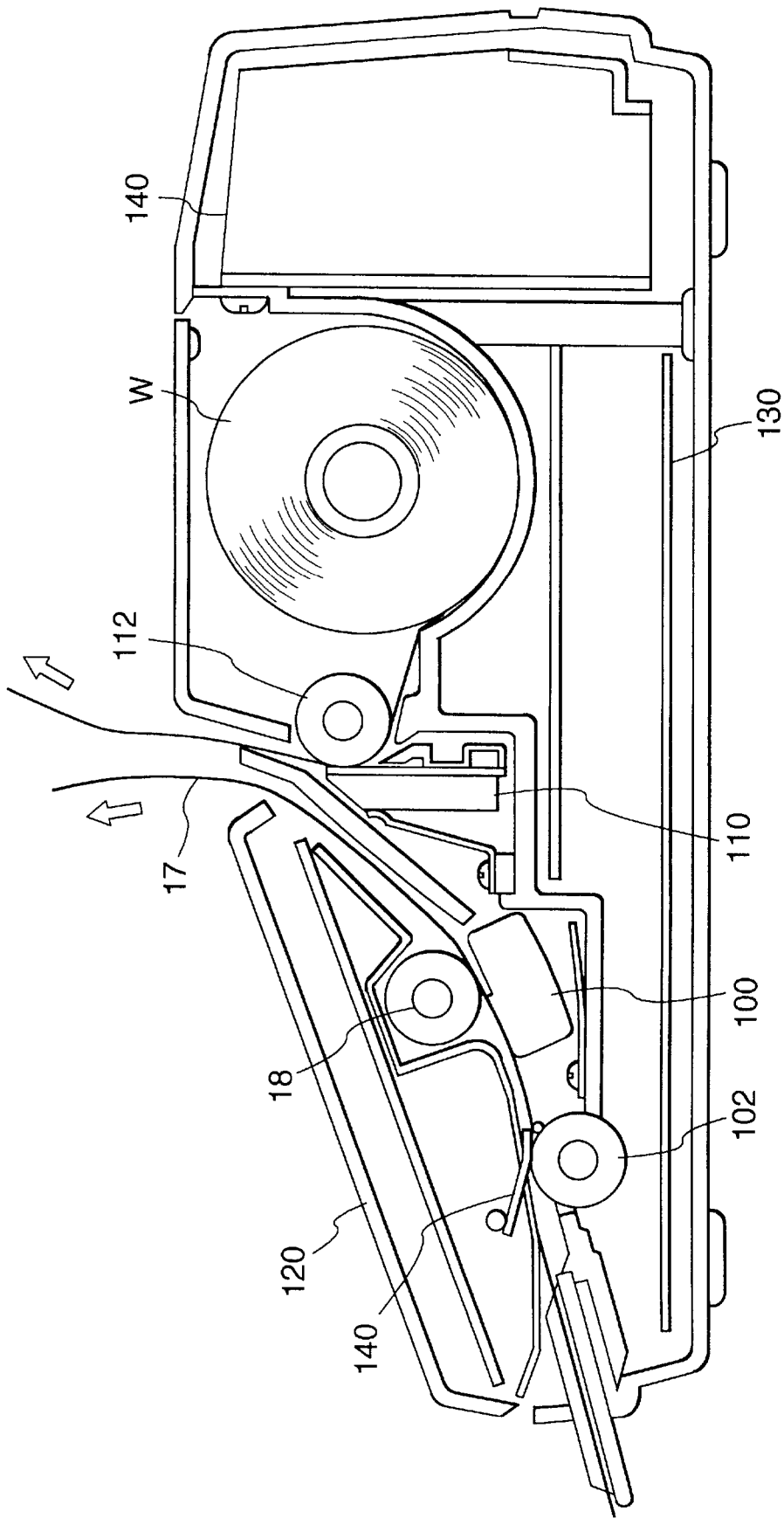
FIG. 8 shows a sectional view of an information processing system to which the illumination device of the present invention is applied.

FIG. 8 shows an information processing apparatus (for example a facsimile machine) constructed by using the photo-electric conversion device of the present invention.

Numeral 102 denotes a feed roller for feeding a document sheet 17 toward a read position, numeral 104 denotes a separator for separating and feeding the document sheet P one at a time, and numeral 18 denotes a transport roller provided at the read position of the photo-electric conversion device 100 for defining a read plane of the document sheet 17 and transporting the document sheet 17.

W denotes a recording medium in the form of a rolled sheet on which image information read by the photo-electric conversion device 100, or image signal externally transmitted in the case of the facsimile machine is formed. Numeral 110 denotes a recording head for forming the image and it may be a thermal head, an ink jet recording head or other head. The recording head may be either serial type or line type. Numeral 112 denotes a platen controller for transporting the recording medium W to the recording position of the recording head 110 and defining the record plane.

Numeral 120 denotes a console panel having switches for operation inputs and a display for displaying a message and a state of the device arranged therein.

Numeral 130 denotes a system control board on which a control unit for controlling the respective units, a drive circuit of the photo-electric conversion elements, a processing unit for the image information and a transmitter/receiver unit are arranged. Numeral 140 denotes a power supply of the device.

The output method applicable to the information processing system shown in FIG. 8 includes a thermal transfer recording method using a thermal head and an ink jet recording method using an ink jet recording head.

A configuration when the recording head of this type is connected to the output unit of the information processing system as the output means is now explained. Only the output unit is explained here.

Of the ink jet recording system, the recording head using the thermal energy provides a better effect to the present invention because the effect of the compaction of the illumination device is reflected to the entire information processing system as the head itself can be compact.

The typical construction and the operational principles are preferably the ones disclosed in U.S. Pat. No. 4,723,129 and U.S. Pat. No. 4,740,796. The principle and the structure are applicable to so-called on-demand type recording systems and continuous type recording systems, but the on-demand type is suitable because it permits the reduction of the size.

This system is briefly explained. At least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through a discharge port to produce at least one droplet. The driving signal is preferably in the form of pulse because the development and the contraction of the bubbles can be effected instantaneously, and therefore the liquid (ink) is ejected with fast response.

The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents.

In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port.

The present invention is effectively applicable to a so-called full-line type recording head having a length corresponding to the maximum recording width. Such a recording head may be comprised of a single recording head and plural recording head combined to cover the maximum width.

In addition, the present invention is applicable to a serial type recording head in which the recording head is fixed on a main assembly, to a replaceable chip type recording head which is connected electrically with the apparatus and can be supplied with the ink when it is mounted in the main assembly, or to a cartridge type recording head having an integral ink container.

The provision of the recovery means and/or the auxiliary means for the preliminary operation are preferable because they further stabilize the effects of the present invention.

As for such means, there are capping means for the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

Further, as a recording mode, the present invention is effectively applicable to an apparatus having at least one of a monochromatic mode mainly with black, a multi-color mode with different color inks and/or full color mode using the mixture of colors.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied. The present invention is applicable to other types of ink. In one of them, the temperature rise due to the thermal energy is positively prevented by consuming it for the state change of the ink from the solid state to the liquid state. Other ink is solidified when it is left, to prevent the evaporation of the ink. In any case, the application of the recording signal producing thermal energy, the ink is liquefied, and the liquefied ink may be discharged. Other ink may start to be solidified at the time when it reaches the recording sheet. The present invention is also applicable to the ink which is liquefied by the application of the thermal energy.

A system in which the recording is made by discharging the liquid by utilizing the thermal energy is now explained briefly.

Figure 9:
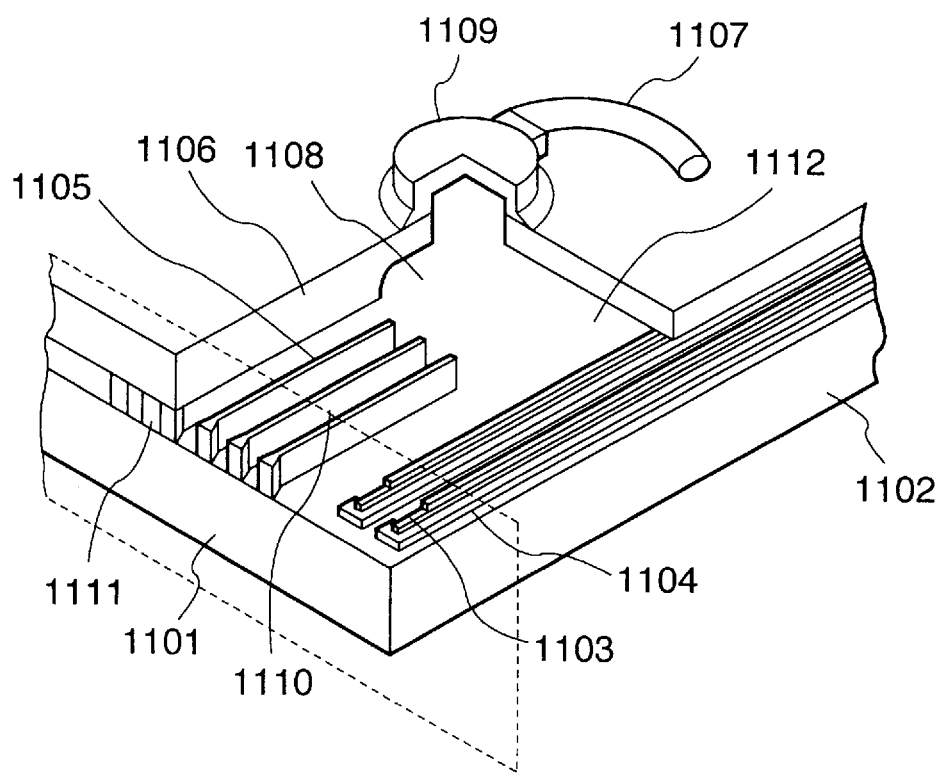
FIG. 9 shows a perspective view of an example of an ink jet recording head which is applicable to the information processing system of the present invention.

FIG. 9 shows a construction of an ink jet recording head which comprises an electro-thermal transducer 1103, an electrode 1104, a liquid path 1105 and a top plate 1106 formed on a substrate 1102 through a semiconductor manufacturing process such as etching, vapor deposition and sputtering. Recording liquid 1112 is supplied from a liquid storage, not shown to a common liquid chamber 1108 of the recording head 1101 through a liquid supply tube 1107. Numeral 1109 denotes a liquid supply tube connector.

The liquid supplied to the common liquid chamber 1108 is supplied to the liquid path 1110 by a capillary phenomenon and forms a meniscus on the discharge port (orifice) at the end of the liquid path so that it is held stably. By energizing the electro-thermal transducer 1103, the liquid on the electro-thermal transducer is abruptly heated and air bubbles are created in the liquid path. By the expansion and the contraction of the air bubbles, the liquid is discharged from the discharge port 1111 to form droplets.

By this arrangement, a full line type ink jet head having 128 or 256 discharge ports arranged at a high discharge port density of 16 nozzles/mm, or even over the entire recording width can be provided.

Figure 10:
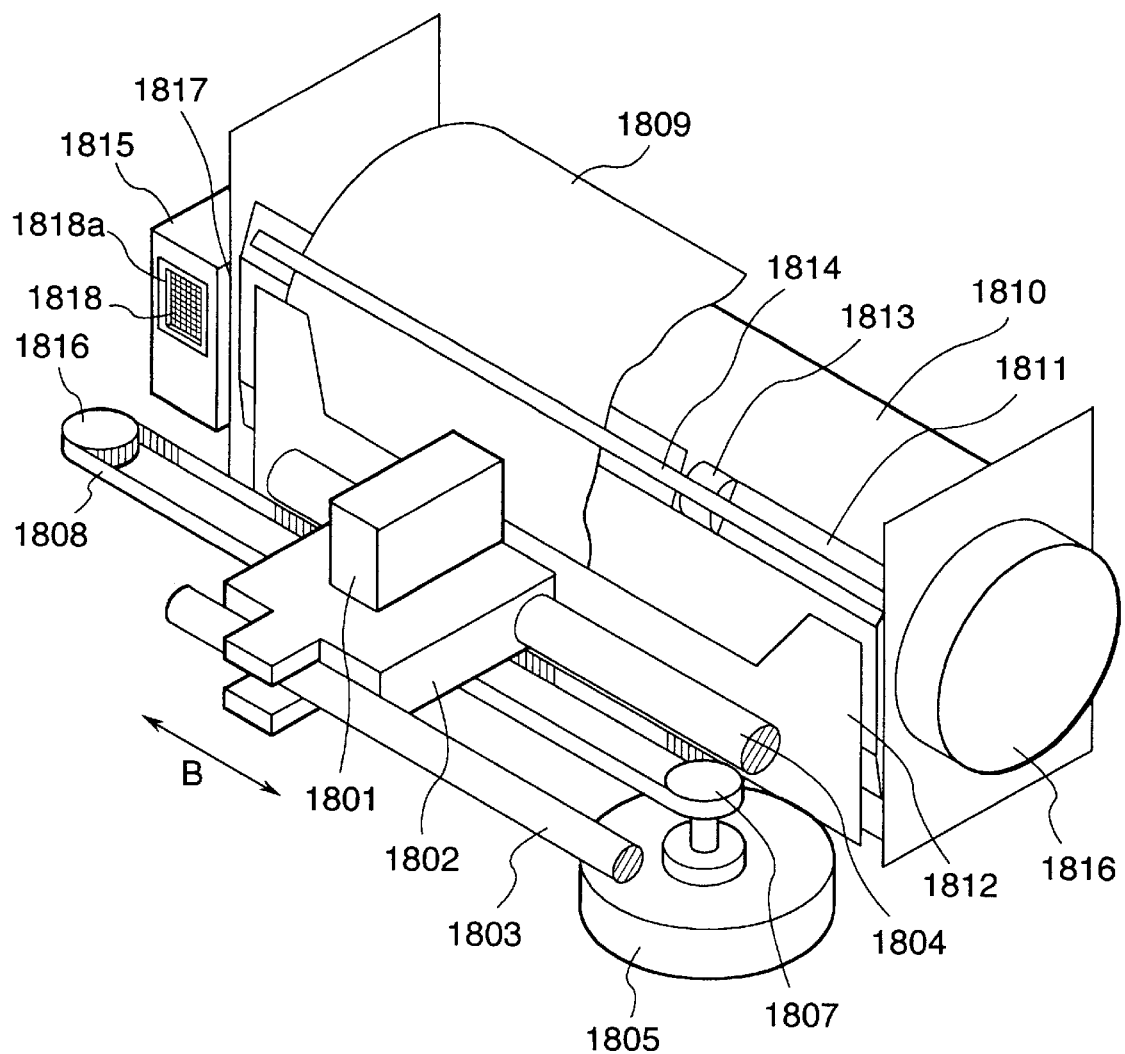
FIGS. 10 and 12 show perspective views of a recording unit using an ink jet recording system applicable to the information processing system of the present invention.

FIG. 10 shows a perspective view of an external construction of an output unit using the ink jet recording system.

In FIG. 10, numeral 1801 denotes an ink jet recording head which discharges the ink in accordance with a predetermined record signal to record a predetermined image, and numeral 1802 denotes a carriage for scanning the recording head 1801 along the recording direction (main scan direction). The carriage 1802 is slidably supported by guide shafts 1803 and 1804 and reciprocally driven along the main scan direction by a timing belt 1808. The timing belt 1808 which engages with pulleys 1806 and 1807 is driven by a carriage motor 1805 through the pulley 1807.

A recording sheet 1809 is guided by a paper ban 1810 and transported by a sheet feed roller, not shown, pinched by a pinch roller.

The transport is conducted by a sheet feed motor 1816 as a drive source. The transported record sheet 1809 is tensioned by a sheet ejection roller 1813 and a spur 1814 and it is transported while it is contacted to a heater 1811 by a retainer plate 1812 made of a resilient member. The record sheet 1809 on which the ink discharged by the recording head is deposited is heated by the heater 1811 and the water of the deposited ink is evaporated and the ink is fixed to the record sheet 1809.

Numeral 1815 denotes a unit called a recovery unit which eliminates foreign material deposited on the discharge port (not shown) of the recording head 1801 and the ink of high viscosity to maintain the normal discharge characteristics.

Numeral 1818a denotes a cap which is a portion of the recovery unit 1815 and caps the discharge port of the recording head 1801 to prevent the clogging. An ink absorber is preferably arranged in the cap 1818a.

A blade 1817 for cleaning the foreign material and ink deposited on the discharge port is provided on the side of the recovery unit 1815 facing the record area to abut against the plane on which the discharge port of the recording head 1801 is formed.

Figure 11:
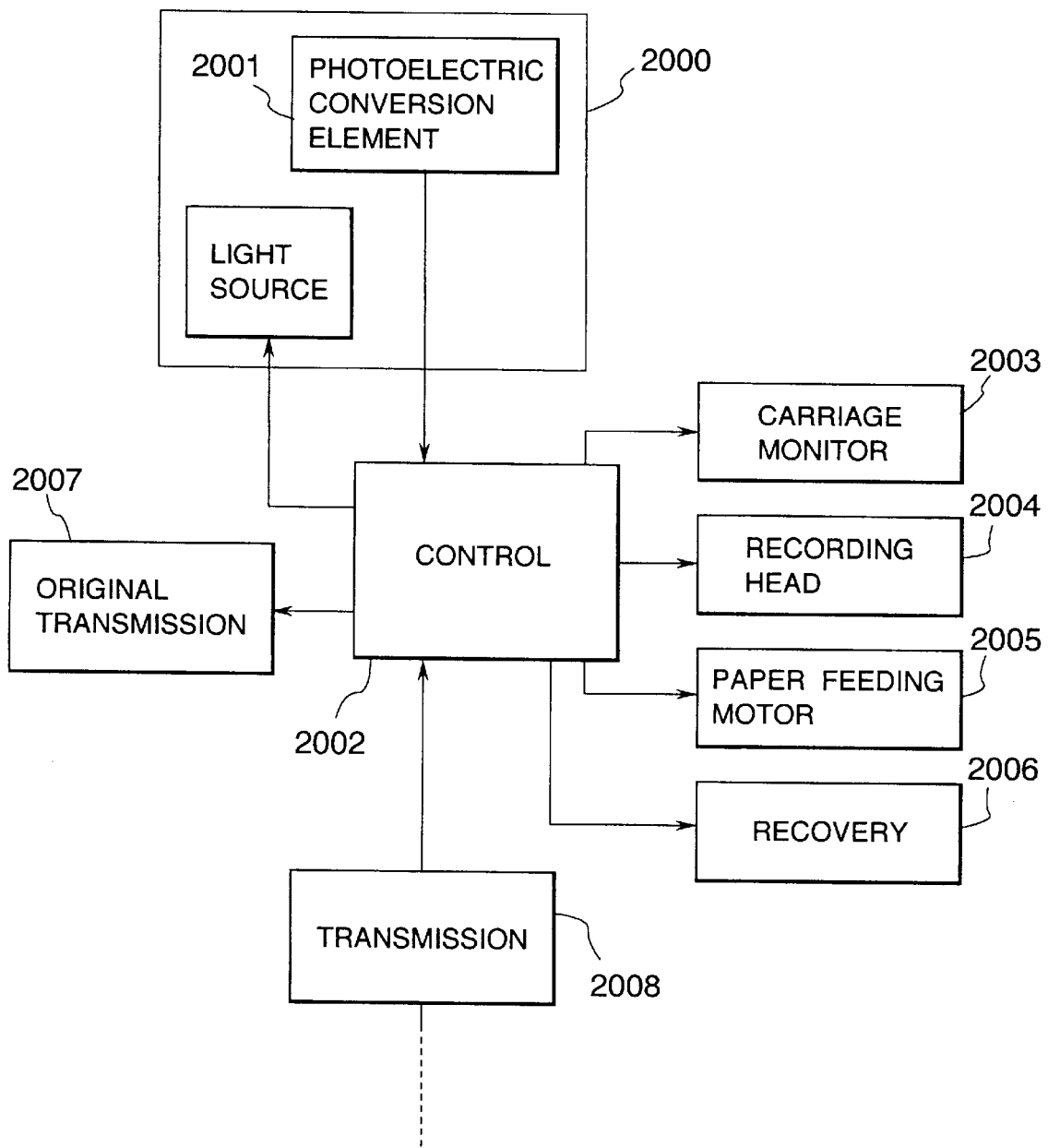
FIG. 11 shows a block diagram of a configuration of the information processing system of the present invention.

In the present invention, as shown in a block diagram of FIG. 11, the document sheet fed to the read unit of the read device 2000 by the document sheet transport means 2007 is read by the photo-electric conversion element 2001 of the read device 2000, and an electrical signal bearing the image signal is converted to an electrical signal by image processing means (not shown) for recording, and a controller such as a CPU 2002 controls the carriage motor 2003, the recording head 2004, the sheet feed motor 2005 and the recovery unit 2006 for recording.

The electrical signal bearing the image information may be transmitted to another image processing apparatus through communication means 2008 and output therefrom, or another information processing system may receive the information through the communication means 2008 to conduct the recording by the recording head 2004.

Figure 12:
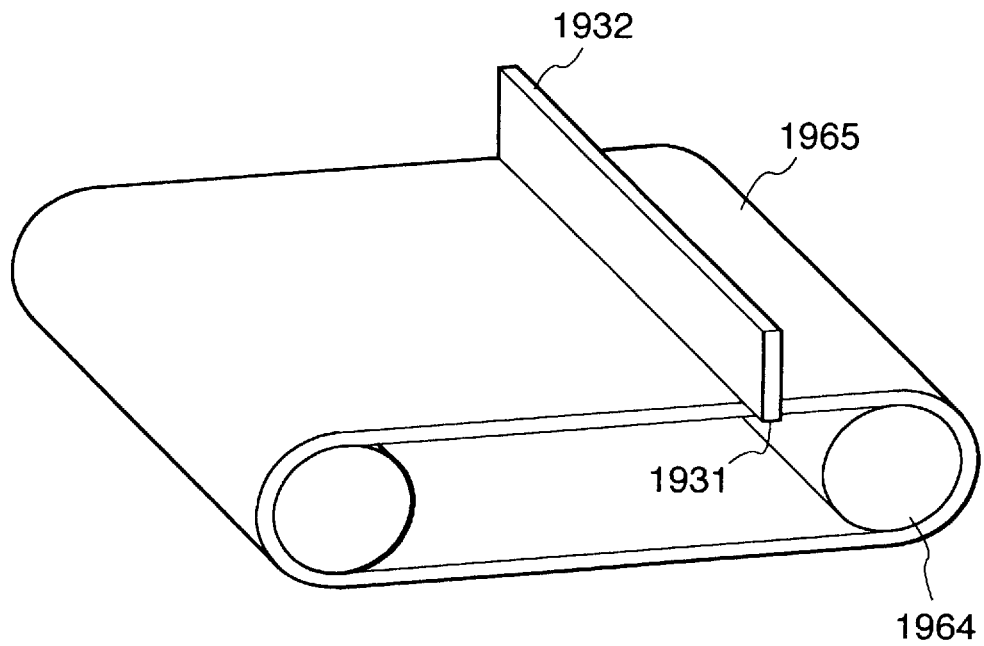

FIG. 12 shows an output unit when a full line type recording head 1932 is mounted.

In FIG. 12, numeral 1965 denotes a feed belt for transporting the record medium and transports the record medium, not shown, as the transport roller 1964 is rotated. The bottom plane of the recording head 1932 is the discharge port plane 1931 having a plurality of discharge ports arranged for the recording area of the recording medium.

In this arrangement, the same recording as that by the serial type head is attained.

The above output unit is illustrative and many modifications thereof may be made.

However, when the system for discharging the liquid by utilizing the thermal energy is used, more compaction is attained and finer recording is attained. Thus, the advantage of the present invention is more effectively utilized and an excellent information processing system is provided.

As described above, according to the present invention, an illumination device which is compact and attains uniform illumination at a high intensity is provided.

The present invention further provides an illumination device which is simple in construction and simple in manufacturing process.

The present invention further provides a photoelectric conversion apparatus and an information processing system which can stably read an image.

The present invention further provides the mounting of the light source in a simple process and a simple method.

The present invention further provides a linear light source having less irregularity of light intensity on the illumination plane to reduce a burden in processing the image and attain high tonality.

The present invention may be modified or changed without departing from the scope of the invention and the embodiments described above may be appropriately combined.

In accordance with the present invention, at least two LED chips having different light emission wavelength ranges are spaced from the normal line passing through the center of the scatter and reflection area of the light transmissive member. Thus, the light beam directly applied to the scatter and reflection area in the respective light emission wavelength range is decreased and the indirect light reflected in the light transmissive member is increased accordingly so that the increase of the illumination in the area close to the LED light source is avoided and the longitudinal illumination of the light transmissive member is uniform, and the ratios of the illuminations of the respective light emission wavelength ranges at any longitudinal position of the document sheet illumination are equal.

In accordance with the present invention, the read signal of the color document sheet is uniform without providing an illumination compensation circuit, and an information processing system suitable for reading the color document sheet is provided without increasing the cost.

What is claimed is:

1. An illumination device for illuminating an original by reflecting a light beam emitted from an illumination means, arranged at an end of a light conductor, the light beam being reflected at a reflection area of said light conductor, the reflection area being arranged at a part of said light conductor, and said illumination means comprising at least two light emitting elements of different light emission wavelength ranges, wherein a center of one of said light emitting elements is deviated in a widthwise direction from a normal line passing through a center of the reflection area when viewed in a longitudinal direction of said light conductor.

2. An illumination device according to claim 1, wherein said light emitting elements are arranged symmetrically to the normal line passing through the center of the scatter and reflection area at positions spaced from the normal line by equal distances from the scatter and reflection area.

3. An illumination device according to claim 1 wherein said at least two light emitting elements of different light emission wavelength ranges are LED's.

4. An illumination device according to claim 1, wherein the scatter and reflection area of the light conductor is formed along a longitudinal direction of the light conductor, the illumination means is arranged at an end of the longitudinal direction of the light conductor, and reflection means is formed at a second end of the light conductor.

5. An illumination device according to claim 1 wherein said area is formed by light reflective paint.

6. An illumination device according to claim 1 wherein said area is a roughened surface.

7. An illumination device according to claim 1, wherein the at least two light emitting elements emit at least a green light wavelength range and a red light emission wavelength range, respectively.

8. An illumination device according to claim 1, wherein the light emitting elements of different wavelength ranges have at least different intensities, respectively.

9. An illumination device according to claim 1, wherein the illumination means is provided at the end of the light conductor.

10. An illumination device according to claim 1, wherein the illumination means are provided at the end and a second end of the light conductor.

11. An illumination device according to claim 1, wherein the illumination means is provided at the end of the light conductor, and a reflection means is provided at a second end of the light conductor.

12. An illumination device according to claim 1, wherein said illumination means is arranged at the longitudinal end of the light conductor.

13. An illumination device comprising:

(a) a plurality of light sources each having different light emission wavelength ranges, placed at a part of a light guide; and (b) a reflection portion, arranged at a part of said light guide, for reflecting light emitted by said plurality of light sources, wherein a normal line passing through a center of a width of the reflection portion deviates in a widthwise direction from a center of one of said plurality of light sources, when viewed from a longitudinal direction of said light guide.

14. An illumination device according to claim 13, wherein said plurality of light sources comprise a plurality of light emitting diodes.

15. An illumination device according to claim 13, wherein said reflection portion is formed along a longitudinal direction of said illumination device, wherein said plurality of light sources is arranged at a first end of the longitudinal direction of said illumination device, and wherein said reflection portion is formed at a second end of said illumination device.

16. An illumination device according to claim 13, wherein said reflection portion is formed by light reflective paint.

17. An illumination device according to claim 13, wherein said reflection portion comprises a roughened surface.

18. An illumination device according to claim 13, wherein one of said plurality of light sources emits light in at least a green light wavelength range and another of said plurality of light sources emits light in at least a red light wavelength range.

19. An illumination device according to claim 13, wherein said plurality of light sources is provided at a first end of said illumination device, and wherein said reflection portion is provided at a second end of said illumination device.

20. An illumination device for illuminating an original by reflecting a light beam emitted from illumination means, arranged at a longitudinal end of a light conductor, the light beam being reflected at a reflection area of said light conductor, the reflection area being arranged at a part of said light conductor, wherein the illumination means comprises at least two light emitting elements of different light emission wavelength ranges, and wherein a line passing through a center of one of said at least two light emitting elements is deviated in a widthwise direction from a normal line passing through a center of a width of the reflection area.

21. An illumination device comprising:

(a) a plurality of light sources each having different light emission wavelength ranges, placed at a part of a light guide;

(b) a reflection portion, arranged at a part of the light guide, for reflecting light emitted by said plurality of light sources, wherein a normal line passing through a center of a width of said reflection portion deviates in a widthwise direction from a light beam axis of one of said plurality of light sources, when viewed in the direction of the light beam axis.

22. An illumination device according to claim 21, wherein said plurality of light sources comprise a plurality of light emitting diodes.

23. An illumination device according to claim 21, wherein said reflection portion is formed along a longitudinal direction of said illumination device, wherein said plurality of light sources is arranged at a first end of the longitudinal direction of said illumination device, and wherein said reflection portion is formed at a second end of said illumination device.

24. An illumination device according to claim 21, wherein said reflection portion is formed by light reflective paint.

25. An illumination device according to claim 21, wherein said reflection portion comprises a roughened surface.

26. An illumination device according to claim 21, wherein one of said plurality of light sources emits light in at least a green light wavelength range and another of said plurality of light sources emits light in at least a red light wavelength range.

27. An illumination device according to claim 21, wherein said plurality of light sources is provided at a first end of said illumination device, and wherein said reflection portion is provided at a second end of said illumination device.

28. An illumination device comprising:

(a) a plurality of light sources each having different light emission colors, placed at a part of a light guide; and (b) a reflection portion, arranged at a part of said light guide, for reflecting light emitted by said plurality of light sources, wherein a normal line passing through a center of a width of the reflection portion deviates in a widthwise direction from a center of one of said plurality of light sources, when viewed from a longitudinal direction of the light guide.

29. An illumination device according to claim 28, wherein said plurality of light sources comprise a plurality of light emitting diodes.

30. An illumination device according to claim 28, wherein the reflection portion is formed along a longitudinal direction of said illumination device, wherein said plurality of light sources is arranged at a first end of the longitudinal direction of said illumination device, and wherein the reflection portion is formed at a second end of said illumination device.

31. An illumination device according to claim 28, wherein the reflection portion is formed by light-reflective paint.

32. An illumination device according to claim 28, wherein the reflection portion comprises a roughened surface.

33. An illumination device according to claim 28, wherein one of said plurality of light sources emits green light and another of said plurality of light sources emits red light.

34. An illumination device according to claim 28, wherein said plurality of light sources is provided at a first end of said illumination device, and wherein the reflection portion is provided at a second end of said illumination device.

35. An illumination device comprising:

(a) a plurality of light sources each having different light emission ranges arranged at a longitudinal end of a light guide;

(b) a reflection portion, arranged at a part of said light guide, for reflecting light emitted by said plurality of light sources, wherein a line passing through a center of one of said plurality of light sources is deviated in a widthwise direction from a normal line passing through a center of a width of the reflection portion.

36. An illumination device according to claim 35, wherein said plurality of light sources comprise a plurality of light emitting diodes.

37. An illumination device according to claim 35, wherein the reflection portion is formed along a longitudinal direction of said illumination device, wherein said plurality of light sources is arranged at a first end of the longitudinal direction of said illumination device, and wherein the reflection portion is formed at a second end of said illumination device.

38. An illumination device according to claim 35, wherein the reflection portion is formed by light-reflective paint.

39. An illumination device according to claim 35, wherein the reflection portion comprises a roughened surface.

40. An illumination device according to claim 35, wherein one of said plurality of light sources emits green light and another of said plurality of light sources emits red light.

41. An illumination device according to claim 35, wherein said plurality of light sources is provided at a first end of said illumination device, and wherein the reflection portion is provided at a second end of said illumination device.

42. An illumination device according to claims 21 or 35, wherein the normal line passing through the center of the width of the reflection portion deviates in the widthwise direction from a parallel plane including a light beam axis when viewed in the direction of the light beam axis.

43. An illumination device according to claims 13, 21, 28, or 35, wherein said plurality of light sources are arranged at a longitudinal end of said light guide.

44. An illumination device for illuminating an original by reflecting a light beam emitted from illumination means, arranged at a longitudinal end of a light conductor, the light beam being reflected at a reflection area of the light conductor, the reflection area being arranged at a part of said light conductor, wherein said illumination means comprises at least two light emitting elements of different light emission wavelength ranges, and wherein a center of one of said at least light emitting elements is deviated in a widthwise direction from a normal plane extending in the longitudinal direction and passing through a center of a width of the reflection area.

45. An illumination device according to claims 20 or 44, wherein the longitudinal direction is a main scan direction and the widthwise direction is a sub-scan direction.

46. An illumination device according to claims 20 or 44, wherein a normal plane passing through the center of the width of the reflection area passes through a read position of the original.

47. An illumination device for illuminating an original by reflecting a light beam emitted from illumination means, arranged at a longitudinal end of a light conductor, the light beam being reflected at a reflection area of said light conductor, the reflection area being arranged at a part of the light conductor, wherein the illumination means comprises at least two light emitting elements of different light emission wavelength ranges, and wherein a center of one of the light emitting elements is deviated from a normal line passing through a center of the width of the reflection area in a widthwise direction when viewed from a longitudinal direction of said light conductor.

48. An illumination device comprising:

a plurality of light sources each having different light emission colors; and a longitudinal light guide, for guiding light introduced from a plurality of light sources and for emitting the light along a longitudinal side thereof, having a longitudinal reflection member arranged along said light guide for reflecting the light from said plurality of light sources, wherein at least at an end of said reflection member near said plurality of light sources, a normal line passing through a center of a width of said reflection member is shifted from a center of at least one of said plurality of light sources, when viewed from a longitudinal direction of said light guide.

49. A device according to claim 48, wherein said reflection member includes light-reflecting paint.

50. A device according to claim 48, wherein said reflection member includes a coarse surface.

51. An illumination device comprising:

a longitudinal surface that extends in a longitudinal direction of a light guide;

an end surface disposed at one longitudinal end of said longitudinal surface;

a plurality of light sources disposed on the end surface, the plurality of light sources each having different light emission colors; and a longitudinal reflection member disposed on the longitudinal surface, a reflection member normal line that passes through a center of a width of said longitudinal reflection member being shifted, at least at an end of said longitudinal reflection member near the end surface, from a center of at least one of said plurality of light sources when viewed from a longitudinal direction of said light guide.

52. A device according to claim 51, wherein said reflection member includes light-reflecting paint.

53. A device according to claim 51, wherein said reflection member includes a coarse surface.

54. An illumination device comprising:

a longitudinal surface that extends in a longitudinal direction of said light guide;

an end surface disposed at one longitudinal end of the longitudinal surface;

a longitudinal reflection member disposed on the longitudinal surface; and a plurality of light sources each having different light emission colors disposed on the end surface, at least one said plurality of light sources being shifted from a normal plane that passes through a center of a width of said longitudinal reflection member.

55. A device according to claim 54, wherein said reflection member includes light-reflecting paint.

56. A device according to claim 54, wherein said reflection member includes a coarse surface.

* * * * *

UNITED STATES PATENT AND TRADEMARK OFFICE
CERTIFICATE OF CORRECTION

PATENT NO. : 5,808,295

DATED : September 15, 1998

INVENTOR(S) : SHINICHI TAKEDA, ET AL.

It is certified that error appears in the above-identified patent and that said Letters Patent is hereby corrected as shown below:

COVER PAGE [56] RC,
Foreign Patent Documents, "2102058" should read --2-102058--, "3193366" should read --3-193366--, "5208504" should read --5-208504--, and "5224019" should read --5-224019--.

COVER PAGE [57] Abstract,
Line 13, "device 30" should read --device 30 has--.

COLUMN 11,
Line 28, "head" should read --heads--.

COLUMN 12,
Line 9, "Jet" should read --jet--; and
Line 15, "shown" should read --shown,--.

COLUMN 14,
Line 24, "scatter and" should be deleted;
Line 26, "scatter and" should be deleted;
Line 27, "claim 1" should read --claim 1,--;
Line 31, "scatter and" should be deleted;
Line 36, "claim 1" should read --claim 1,--; and
Line 38, "claim 1" should read --claim 1,--.

UNITED STATES PATENT AND TRADEMARK OFFICE
CERTIFICATE OF CORRECTION

PATENT NO. : 5,808,295

DATED : September 15, 1998

INVENTOR(S) : SHINICHI TAKEDA, ET AL.

It is certified that error appears in the above-identified patent and that said Letters Patent is hereby corrected as shown below:

<u>COLUMN 15</u>,
Line 3, "from" should read --in--.

<u>COLUMN 16</u>,
Line 15, "from" should read --in--.

<u>COLUMN 17</u>,
Line 44, "from" should read --in--.

<u>COLUMN 18</u>,
Line 8, "from" should read --in--; and
Line 29, "from" should read --in--.

Signed and Sealed this

Twenty-first Day of September, 1999

Attest:

Q. TODD DICKINSON

*Attesting Officer*     Acting Commissioner of Patents and Trademarks